Patented June 4, 1929.

1,715,439

UNITED STATES PATENT OFFICE.

GERHARD ELIAS VAN NES, OF PASOEROEAN, JAVA, DUTCH EAST INDIES.

MANUFACTURE AND USE OF ADSORBING AGENTS CONTAINING SILICA.

No Drawing. Application filed April 30, 1927, Serial No. 188,061, and in the Netherlands July 26, 1926.

In the known processes for the manufacture of adsorbing agents containing silica, silica is precipitated as a gel by the addition of an acid to an aqueous solution of a silicate. After having been washed, the gel is dehydrated and prepared for further use by drying. Owing to the form in which the silica is precipitated in these processes, the washing and dehydration are troublesome and time-consuming operations.

According to this invention, it is possible to precipitate silica, in a form in which it can be easily filtered, from an aqueous liquid in which it is present in solution in the form of a salt, or in which it is dispersed as a colloid, if a base and an acid, preferably a base and an acid which yield together an insoluble precipitate, are allowed to react either simultaneously, consecutively, or alternately with the solution or dispersion. Preferably bases or acids are used which react to form salts having adsorbing, decolorizing or other particularly desirable properties.

According to a further feature of the invention, a liquid may be decolorized by carrying out the precipitation of the silica, in the manner hereinbefore described, in the liquid to be decolorized, instead of first preparing the precipitate in an aqueous solution.

The following examples illustrate the invention:—

I. 5 grams of commercial waterglass are dissolved in 500 cc. of water. To this solution 10 cc. of milk of lime of 15° Baumé are added and carbon-dioxide is introduced until the liquid shows only a weakly alkaline reaction towards phenolphthalein. A flocculent precipitate separates which settles rapidly and can be easily filtered. The precipitate is washed and finally dried; it has the strong adsorption properties of a silica gel prepared according to known methods. The mother liquor, which still contains silicate, may be used for a subsequent preparation.

II. 10 grams of waterglass are dissolved in 1000 grams of cold dilute cane-sugar molasses of about 30° Brix. 20 cc. of milk of lime of 15° Baumé are added, the solution being meanwhile saturated with carbon-dioxide, care being taken that the liquid remains strongly alkaline in reaction. The introduction of carbon-dioxide is then continued until the liquid has an alkalinity corresponding with 600 milligrams of CaO per litre, whereupon the precipitate is filtered. The filtrate is again saturated until its reaction is weakly alkaline towards phenolphthalein.

The solution, which was originally dark red, has now become clear light yellow.

In the examples the lime may be replaced by or used in conjunction with another base or bases, for example magnesium hydroxide, barium hydroxide, aluminium hydroxide, or the like, and the carbon-dioxide may also be replaced by or used in conjunction with another acid or acids, for example sulphurous acid, phosphoric acid or the like. When using sulphurous acid, for example, an additional advantage is gained owing to the fact that the decolorizing properties of the precipitate are increased by the reducing properties of sulphite present in the precipitate.

What I claim is:—

1. In the manufacture of adsorbing agents containing silica, the step of adding to an aqueous liquid containing dissolved silica a basic substance and an acid substance which react directly upon each other to yield a precipitate in said aqueous liquid.

2. In the manufacture of adsorbing agents containing silica, the step of adding to an aqueous liquid containing dissolved silica a basic substance and an acid substance which react directly upon each other to yield, in said aqueous liquid, a precipitate having adsorbing and decolorizing properties.

3. A process of decolorizing liquids comprising the step of forming in the liquid to be decolorized an adsorbing agent containing silica by adding to said liquid a soluble silicate, a basic substance and an acid substance; the basic substance and the acid substance being capable of reacting directly upon each other to form a precipitate.

In testimony whereof I affix my signature.

GERHARD ELIAS VAN NES.